United States Patent
Suryanarayanan et al.

(10) Patent No.: US 9,532,092 B1
(45) Date of Patent: Dec. 27, 2016

(54) MULTIPLE BITRATE FORMAT-AGNOSTIC STREAMING ARCHITECTURE

(75) Inventors: Babu Suryanarayanan, Foster City, CA (US); Ronnie So, San Mateo, CA (US); Mihir Parikh, San Mateo, CA (US); Ashok Jaiprakash Lalwani, San Mateo, CA (US); Abdul Salam Faisal Padinjareveetil, San Jose, CA (US); James Egerton, Mountain View, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 12/981,676

(22) Filed: Dec. 30, 2010

Related U.S. Application Data

(60) Provisional application No. 61/290,906, filed on Dec. 30, 2009, provisional application No. 61/290,907, filed on Dec. 30, 2009.

(51) Int. Cl.
 *G06F 15/16* (2006.01)
 *H04N 21/2662* (2011.01)

(52) U.S. Cl.
 CPC ................. *H04N 21/2662* (2013.01)

(58) Field of Classification Search
 CPC ....................................... G06F 15/16
 USPC ................................ 709/217, 218
 See application file for complete search history.

(56) References Cited

U.S. PATENT DOCUMENTS

| | | | |
|---|---|---|---|
| 8,271,610 B2* | 9/2012 | Cao et al. | 709/218 |
| 2004/0049598 A1* | 3/2004 | Tucker et al. | 709/246 |
| 2006/0242155 A1* | 10/2006 | Moore et al. | 707/10 |
| 2011/0022471 A1* | 1/2011 | Brueck et al. | 705/14.61 |
| 2011/0080940 A1* | 4/2011 | Bocharov et al. | 375/240.01 |

* cited by examiner

*Primary Examiner* — Glenford Madamba
(74) *Attorney, Agent, or Firm* — David H. Judson

(57) ABSTRACT

A method and apparatus for delivering a content stream is implemented within a content delivery network (CDN) and, in one embodiment, includes the high level functions of recording the stream using a recording tier, and playing the stream using a player tier. For a live stream, the step of recording the stream includes a set of sub-steps that begins when the stream is received at a CDN entry point in a source format. The stream is then converted into an intermediate format (IF), which is an internal format for delivering the stream within the CDN and comprises a stream manifest, a set of one or more fragment indexes (FI), and a set of IF fragments. The player process begins when a requesting client is associated with a CDN HTTP proxy. In response to receipt at the HTTP proxy of a request for the stream or a portion thereof, the HTTP proxy retrieves (either from the archive or the data store) the stream manifest and at least one fragment index. Using the fragment index, the IF fragments are retrieved to the HTTP proxy, converted to a target format, and then served in response to the client request. The source format may be the same or different from the target format. Preferably, all fragments are accessed, cached and served by the HTTP proxy via HTTP.

6 Claims, 8 Drawing Sheets

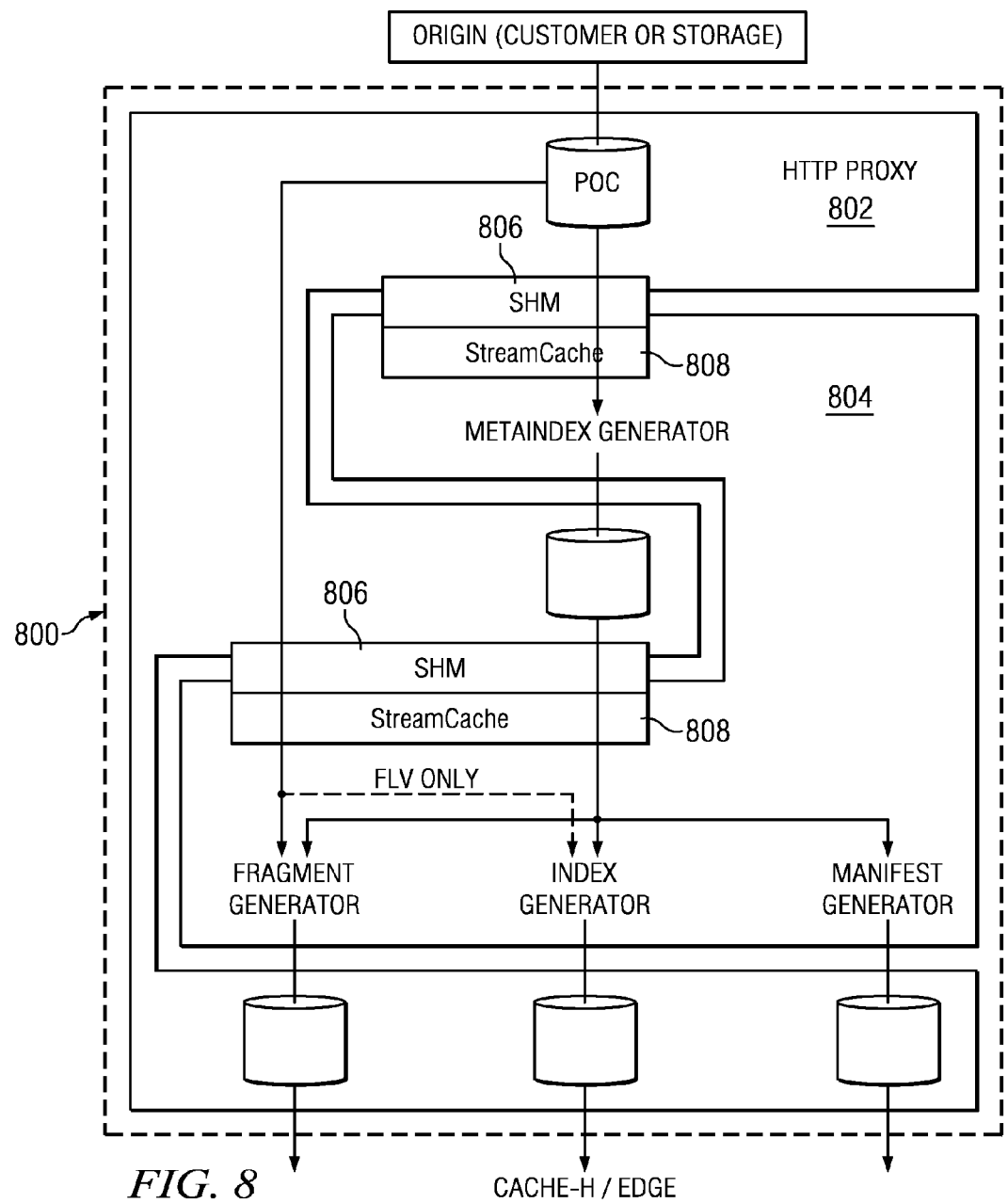

MULTIPLE BITRATE FORMAT-AGNOSTIC STREAMING ARCHITECTURE

This application is based on and claims priority to Ser. No. 61/290,906, and to Ser. No. 61/290,907, each filed Dec. 30, 2009.

BACKGROUND OF THE INVENTION

1. Technical Field

This application relates generally to delivery online of high definition (HD) video at broadcast audience scale to popular runtime environments and mobile devices.

2. Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS query handling, provisioning, data monitoring and reporting, content targeting, personalization, and business intelligence.

While content delivery networks provide significant advantages, typically they include dedicated platforms to support delivery of content for multiple third party runtime environments that are, in turn, based on their own proprietary technologies, media servers, and protocols. These distinct platforms are costly to implement and to maintain, especially globally and at scale as the number of end users increases. Moreover, at the same time, content providers (such as large-scale broadcasters, film distributors, and the like) desire their content to be delivered online in a manner that complements traditional mediums such as broadcast TV (including high definition or "HD" television) and DVD. This content may also be provided at different bit rates. End users also desire to interact with the content as they can do now with traditional DVR-based content delivered over satellite or cable. A further complication is that Internet-based content delivery is no longer limited to fixed line environments such as the desktop, as more and more end users now use mobile devices such as the Apple® iPhone® to receive and view content over mobile environments.

Thus, there is a need to provide an integrated content delivery network platform with the ability to deliver online content (such as HD-quality video) at broadcast audience scale to the most popular runtime environments (such as Adobe® Flash®, Microsoft® Silveright®, etc.) as well as to mobile devices such as the iPhone to match what viewers expect from traditional broadcast TV. The techniques disclosed herein address this need.

BRIEF SUMMARY

An integrated HTTP-based delivery platform that provides for the delivery online of HD-video and audio quality content to popular runtime environments operating on multiple types of client devices in both fixed line and mobile environments.

In one embodiment, a method of delivering a live stream is implemented within a content delivery network (CDN) and includes the high level functions of recording the stream using a recording tier, and playing the stream using a player tier. The step of recording the stream includes a set of sub-steps that begins when the stream is received at a CDN entry point in a source format. The stream is then converted into an intermediate format (IF), which is an internal format for delivering the stream within the CDN and comprises a stream manifest, a set of one or more fragment indexes (FI), and a set of IF fragments. The fragments representing a current portion of the stream are archived in the intermediate format in an archiver, while older (less current) portions are sent to data store. The player process begins when a requesting client is associated with a CDN HTTP proxy. In response to receipt at the HTTP proxy of a request for the stream or a portion thereof, the HTTP proxy retrieves (either from the archive or the data store) the stream manifest and at least one fragment index. Using the fragment index, the IF fragments are retrieved to the HTTP proxy, converted to a target format, and then served in response to the client request. The source format may be the same or different from the target format. Preferably, all fragments are accessed, cached and served by the HTTP proxy via HTTP.

In another embodiment, a method of delivering a stream on-demand (VOD) uses a translation tier to manage the creation and/or handling of the IF components, i.e., the stream manifest, the fragment indexes (FI), and the IF fragments. The translation tier is used in lieu of the recording tier (in the live delivery network). In one VOD embodiment, the translation tier is implemented using an HTTP proxy and a translation process. The approach enables VOD streaming from customer and CDN-based storage origins, provides single and multiple bitrate (SBR and MBR) streaming, provides support for origin content stored in multiple different types of file format containers (supported mp4/flv codes include, among others, AAC, MP3, PCM for audio, and H.264 for video), and minimizes download of content beyond what is directly requested by the end user.

According to another aspect of this disclosure, Intermediate Format (IF) generation and handling may occur entirely within an HTTP proxy. In this approach, IF can be extended throughout the entire downstream HTTP delivery chain including, optionally, to the client itself (if the client also has an HTTP proxy interface).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 illustrates how the network for HTTP-based delivery is used to provide video on demand (VOD) stream delivery;

FIG. 8 illustrates a representative translation machine configuration of the VOD portion of the HTTP-based delivery network;

DETAILED DESCRIPTION

Figure 1:
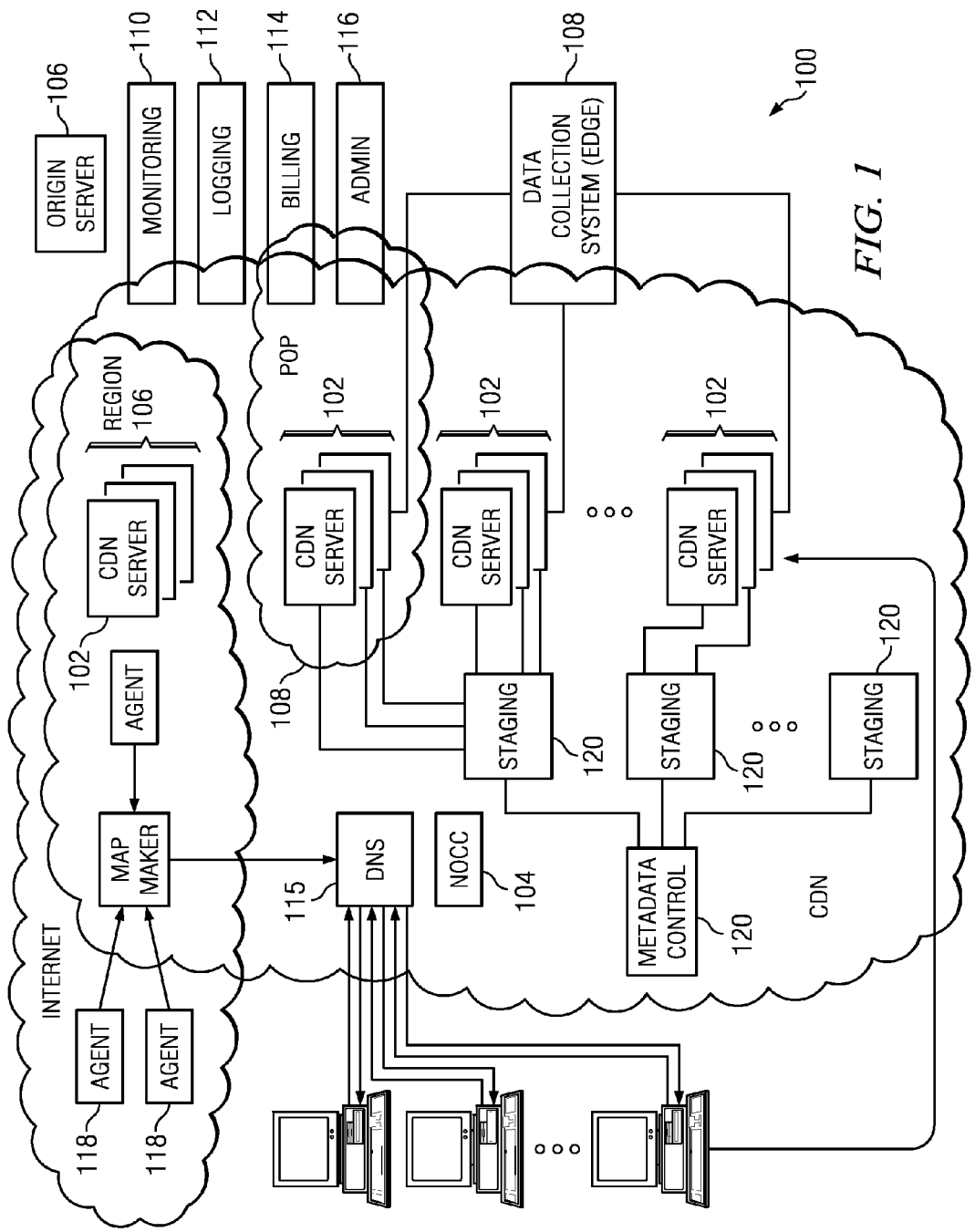
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In this representative embodiment, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 may be used to administer and manage operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
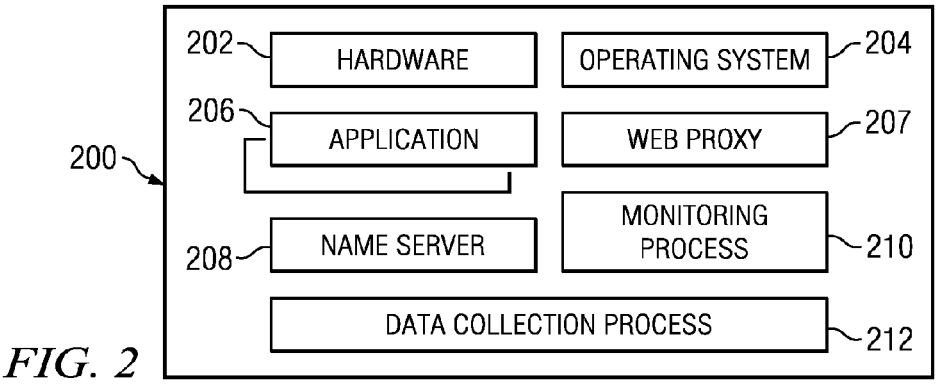
FIG. 2 is a representative CDN edge machine configuration.

As illustrated in FIG. 2, a given machine 200 in the CDN (sometimes referring to herein as an "edge machine") comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (also referred to herein as an "edge server process"), a name server 208, a local monitoring process 210, a distributed data collection process 212, and the like. The HTTP proxy 207 typically comprises a cache, and a manager process for managing the cache and delivery of content from the edge machine. For streaming media, the machine typically includes one or more media servers, such as a Windows Media Server (WMS) or Flash 2.0 server, as required by the supported media formats. When configured as a CDN "edge" machine (or "edge server"), the machine shown in FIG. 2 may be configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information and this and other edge server control information (sometimes referred to as "metadata") can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

For live streaming delivery, the CDN may include a live delivery subsystem, such as described in U.S. Pat. No. 7,296,082, the disclosure of which is incorporated herein by reference.

As will be described, this disclosure describes how the above-identified technologies can be extended to provide an integrated HTTP-based delivery platform that provides for the delivery online of HD-video quality content to the most popular runtime environments and to the latest devices in both fixed line and mobile environments. The platform supports delivery of both "live" and "on-demand" content.

Live Streaming Delivery

As used herein, the following terms shall have the following representative meanings. For convenience of illustration only, the description that follows (with respect to live streaming delivery) is in the context of the Adobe Flash runtime environment, but this is not a limitation, as a similar type of solution may also be implemented for other runtime environments both fixed line and mobile (including, without limitation, Microsoft Silverlight, Apple iPhone, and others).

An Encoder is a customer-owned or managed machine which takes some raw live video feed in some format (streaming, satellite, etc.) and delivers the data to an Entry Point encoded for streaming delivery. An Entry Point (EP) typically is a process running on a CDN streaming machine which receives video data from the customer's Encoder and makes this data available to consumers of the live stream. For Adobe Flash, this is a Flash Media Server (FMS) configured to accept connections from Encoders. A Flash Media Server is a server process for Flash media available from Adobe Corporation. In this embodiment, an Intermediate Region (IR) typically is a Flash Media Server which the CDN has configured to act analogously to a streaming set reflector, such as described in U.S. Pat. No. 7,296,082 and U.S. Pat. No. 6,751,673. These machines relay streams from FMS EPs to FMS Edge regions, providing fan out and path diversity. A "Region" typically implies a set of machines (and their associated server processes) that are co-located and are interconnected to one another for load sharing, typically over a back-end local area network. A Flash Edge machine is a Flash Media Server which has been configured to accept client requests. This is the software running on the Flash EP, IR, and Edge machines in a representative embodiment. Intermediate Format (IF) is an internal (to the CDN) format for sending streaming data from EP to an edge server HTTP proxy. As will be described in more detail below, IF preferably comprises several different pieces, including "Stream Manifest," "Fragment Indexes," and "IF Fragments." Live, DVR and VOD are defined as follows: "Live" refers to media served in real time as an event occurs; "DVR" refers to serving content acquired from a "live" feed but served at a later time; "VOD" refers to media served from a single, complete (i.e., not incrementally changing) file or set of files. Real Time Messaging Protocol (RTMP) is the streaming and RPC protocol used by Flash. Real Time Messaging Protocol Encrypted (RTMPE) is the encrypted version of RTMP using secrets built into the server and client. "SWF" or "Small Web Format" is the format for Flash client applications. SWF verification refers to a technique by which the Flash Player can authenticate to FMS that it is playing an unmodified SWF by sending hashes of the SWF itself along with secrets embedded in the client and server.

Figure 4:
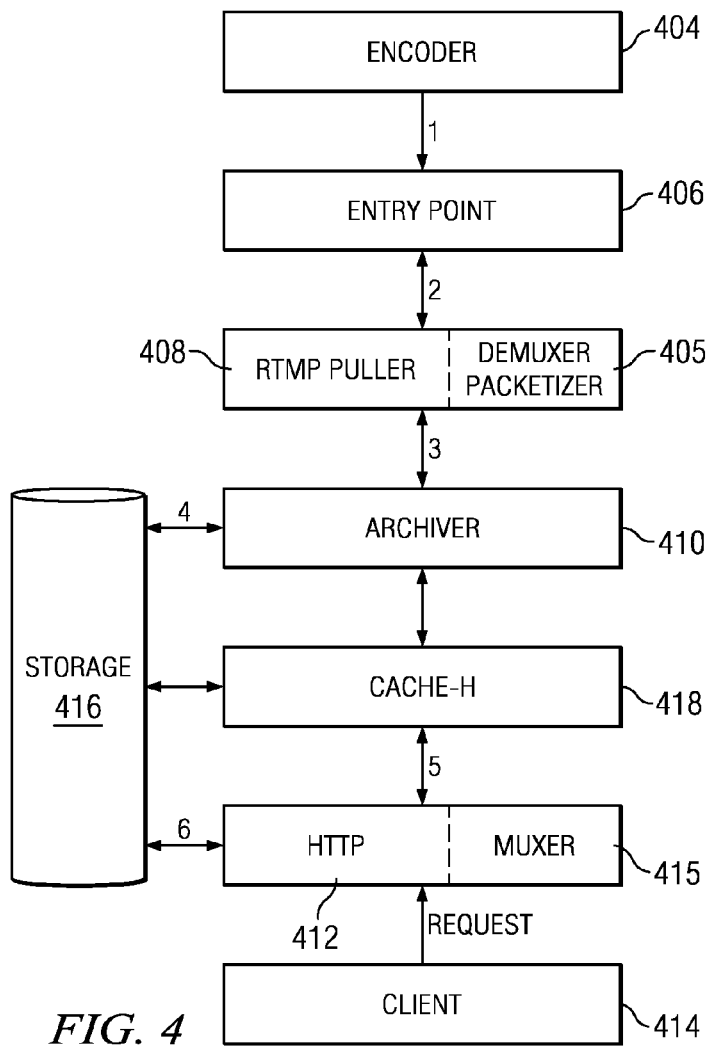
FIG. 4 shows the network of FIG. 3 in additional detail.
Figure 3:
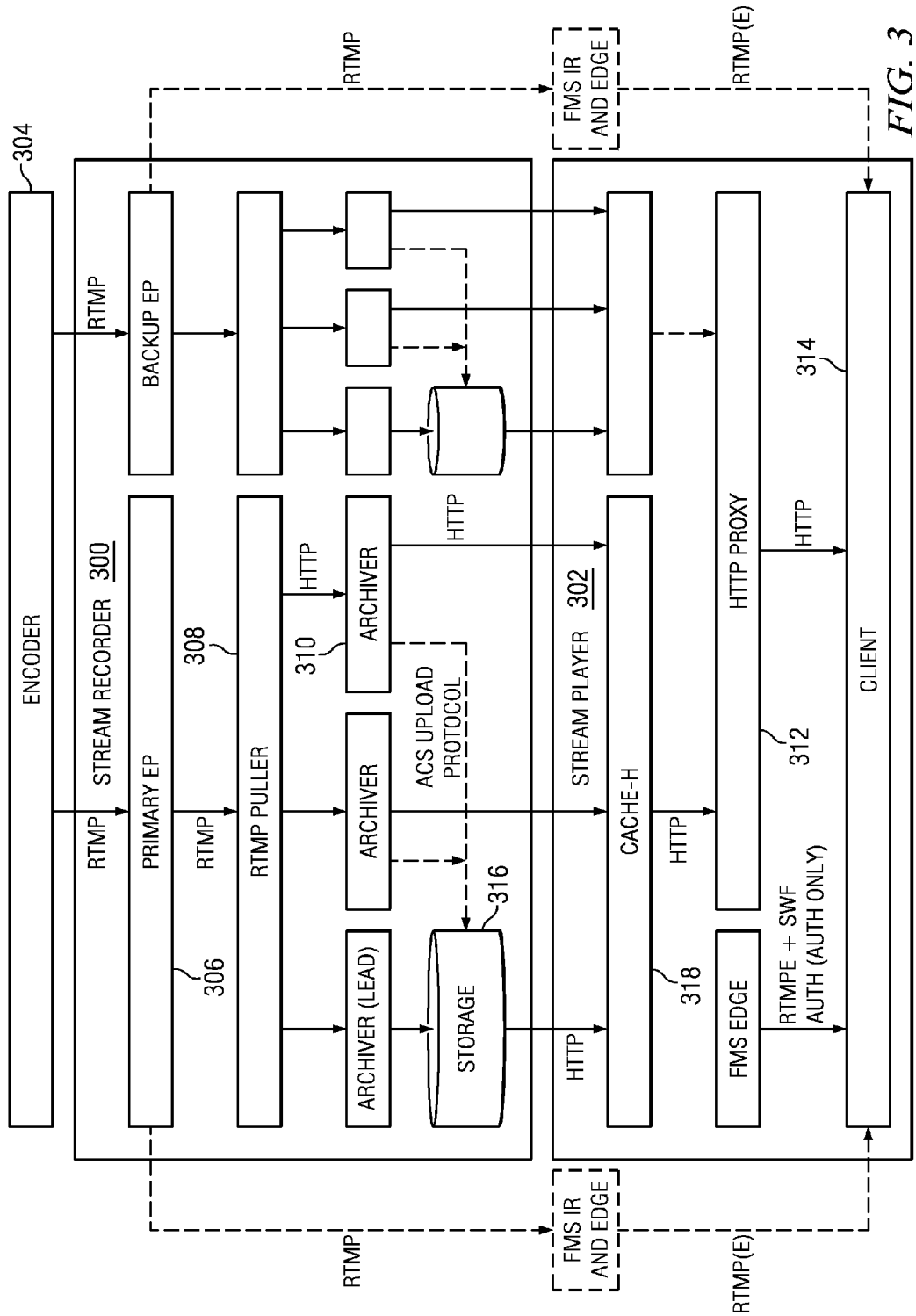
FIG. 3 illustrates a network for HTTP-based delivery of high definition (HD) "live" video to clients across both fixed line and mobile environments according to the teachings of this disclosure.

FIG. 3 illustrates an overview of a preferred architecture for live streaming delivery. A simplified version of this architecture is shown in FIG. 4. As can be seen in FIG. 3, the system generally is divided into two independent tiers: a stream recording tier 300, and a stream player tier 302. As will be described, the recording process (provided by the stream recording tier 300) is initiated from the Encoder 304 forward. Preferably, streams are recorded even if there are currently no viewers (because there may be DVR requests later). The playback process (provided by the stream player tier 302) plays a given stream starting at a given time. Thus, a "live stream," in effect, is equivalent to a "DVR stream" with a start time of "now."

Referring to FIG. 3, the live streaming process begins with a stream delivered from an Encoder 304 to an Entry Point 306. An RTMP Puller component 308 (e.g., running on a Linux-based machine) in an EP Region (not shown) is instructed to subscribe to the stream on the EP 306 and to push the resulting data to one or more Archiver 310 processes, preferably running on other machines. As illustrated, one of the Archivers 310 may operate as the "leader" as a result of executing a leader election protocol across the archiving processes. Preferably, the Archivers 310 act as origin servers for the edge server HTTP proxy processes (one of which is shown at 312) for live or near-live requests. The edge server HTTP proxy 312 provides HTTP delivery to requesting end user clients, one of which is the Client 314. A "Client" is a device that includes appropriate hardware and software to connect to the Internet, that speaks at least HTTP, and that includes a content rendering engine. The Client device type will vary depending on whether the device connects to the Internet over a fixed line environment or a mobile environment. A representative client is a computer that includes a browser, typically with native or plug-in support for media players, codecs, and the like. If DVR is enabled, content preferably is also uploaded to the Storage subsystem 316, so that the Storage subsystem serves as the origin for DVR requests as will be described.

As also seen in FIG. 3, the content provider may choose to deliver two copies of the stream, a primary copy, and a backup copy, to allow the stream to continue with minimal interruption in the event of network or other problems. Preferably, the primary and backup streams are treated as independent throughout the system up through the edge server HTTP proxy, which preferably has the capability of failing over from the primary to the backup when the primary is having difficulties, and vice versa.

A content request (from an end user Client 314) is directed to the CDN edge machine HTTP proxy 312, preferably using techniques such as described in U.S. Pat. Nos. 6,108,703, 7,240,100, 7,293,093 and others. When an HTTP proxy 312 receives an HTTP request for a given stream, the HTTP proxy 312 makes various requests, preferably driven by HTTP proxy metadata (as described in U.S. Pat. Nos. 7,240,100, 7,111,057 and others), possibly via a cache hierarchy 318 (see., e.g., U.S. Pat. No. 7,376,716 and others) to learn about and download a stream to serve to the Client 314. Preferably, the streaming-specific knowledge is handled by the edge machine HTTP proxy 312 directly connected to a Client 314. Any go-forward (cache miss) requests (issued from the HTTP proxy) preferably are standard HTTP requests. In one embodiment, the content is delivered to the Client 314 from the HTTP proxy 312 as a progressive-download FLV file. As noted above, the references herein to Adobe FLV are used herein by way of example, as the disclosed architecture is not limited for use with Adobe FLV. For secure streams, preferably the Client 314 first authenticates to the HTTP proxy 312 using an edge server authentication technique and/or a SWF-verification back-channel.

When a Client 314 requests a particular stream, the HTTP proxy 312 (to which the client has been directed, typically via DNS) starts the streaming process by retrieving a "Stream Manifest" that contains preferably only slowly changing attributes of the stream and information needed by the HTTP proxy to track down the actual stream content. The URL to download this manifest preferably is constructed deterministically from metadata delivered (e.g., via the distributed data transport mechanism of FIG. 1) to the HTTP proxy. Preferably, the manifest itself is stored in association with a Stream Manifest Manager system (not shown) and/or in the storage subsystem 316. Preferably, a Stream Manifest describes the various "tracks" that compose a stream, where preferably each track constitutes a different combination of bit rate and type, where type is "audio," "video," or "interleaved_AV." The Stream Manifest preferably includes a sequence of "indexInfo" time ranges for each track that describe forward URL templates, stream properties, and various other parameters necessary for the HTTP proxy to request content for that time range.

For "live" requests, the HTTP proxy starts requesting content relative to "now," which, in general, is approximately equal to the time on the edge machine HTTP proxy process. Given a seek time, the HTTP proxy downloads a "Fragment Index" whose name preferably is computed based on information in the indexInfo range and an epoch seek time. Preferably, a Fragment Index covers a given time period (e.g., every few minutes). By consulting the Fragment Index, an "Intermediate Format (IF) Fragment" number and an offset into that fragment are obtained. The HTTP proxy can then begin downloading the file (e.g., via the cache hierarchy 318, or from elsewhere within the CDN infrastructure), skipping data before the specified offset, and then begin serving (to the requesting Client) from there. Preferably, the IF fragments are sized for optimal caching by the HTTP proxy. In general, and unless the Stream Manifest indicates otherwise with a new indexInfo range, for live streaming the HTTP proxy then continues serving data from consecutively-numbered IF Fragments.

As used herein, and in the context of live HTTP-based delivery, the Intermediate Format (IF) describes an internal representation of a stream used to get data from the RTMP Puller through to the edge machine HTTP proxy. A "source" format (SF) is a format in which the Entry Point 306 provides content and a "target" format (TF) is a format in which edge machine HTTP proxy 312 delivers data to the Client 314. According to this disclosure, these formats need not be the same. Thus, SF may differ from TF, i.e., a stream may be acquired in FLV format and served in a dynamic or adaptive (variable bit rate) format. The format is the container used to convey the stream; typically, the actual raw audio and video chunks are considered opaque data, although transcoding between different codecs may be implemented as well. By passing the formats through the HTTP proxy (and delivering to the Client via conventional HTTP), the container used to deliver the content can be changed as long as the underlying codecs are managed appropriately.

Referring now to FIG. 4, the HTTP streaming architecture for live content may work as follows. At step 1, a content provider's encoder 404 pushes a live FLV stream to Entry Point (EP) 406. At step 2, the RTMP Puller 408 pulls the stream from the EP 406 and breaks it up into Intermediate Format (IF) file fragments and corresponding index information. A Demuxer process 405 facilitates this operation. The Puller 408 preferably uses metadata from a Stream Manifest file to determine how large to make each individual IF fragment. Preferably, and as noted above, IF fragment size is optimized for caching in the cache associated with an edge machine HTTP proxy.

At step 3, the Archiver 410 retrieves from the Puller 408 the IF fragments along with their corresponding index information. The Archiver 410 appends the index information for each IF fragment to the current Fragment Index (FI) file. Preferably, the Archiver 410 caches a predetermined number of IF fragments for live play-back. As the fragments age out, preferably they are deleted from the Archiver 410 and, at step 4, they are archived, e.g., to the Storage subsystem 416. Thus, at set intervals (e.g., every few minutes), the Archiver 410 closes the current FI file, archives it to the Storage subsystem 416, and begins creating a new FI file.

At step 5, and after an end user Client 414 has been associated with a particular edge machine, the HTTP proxy 412 in that machine gets the fragments for live play-back and limited DVR time periods from the Archiver 410 (possibly via the cache-hierarchy 418). Fragments no longer available on the Archiver 410 are retrieved from the Storage subsystem 416. A Muxer process 415 that operates in association with the HTTP proxy 412 facilitates this operation. Preferably, each IF fragment is a separate object for the HTTP proxy 412 that can be and is accessed through HTTP. In other words, according to this disclosure, the live stream is broken up into many small objects/fragments. The HTTP proxy 412 receives DVR commands from the Client player, typically on a separate HTTP connection. When the client player requests to begin playing from a new stream position, the HTTP proxy uses metadata from the Stream Manifest file to calculate which FI file contains the target time offset. The FI file is retrieved from the Archiver 410 or the storage sub-system 416 (or, alternatively, from a peer machine co-located with the edge machine) and contains the IF fragment and byte offset to begin streaming to the client player.

Figure 5:
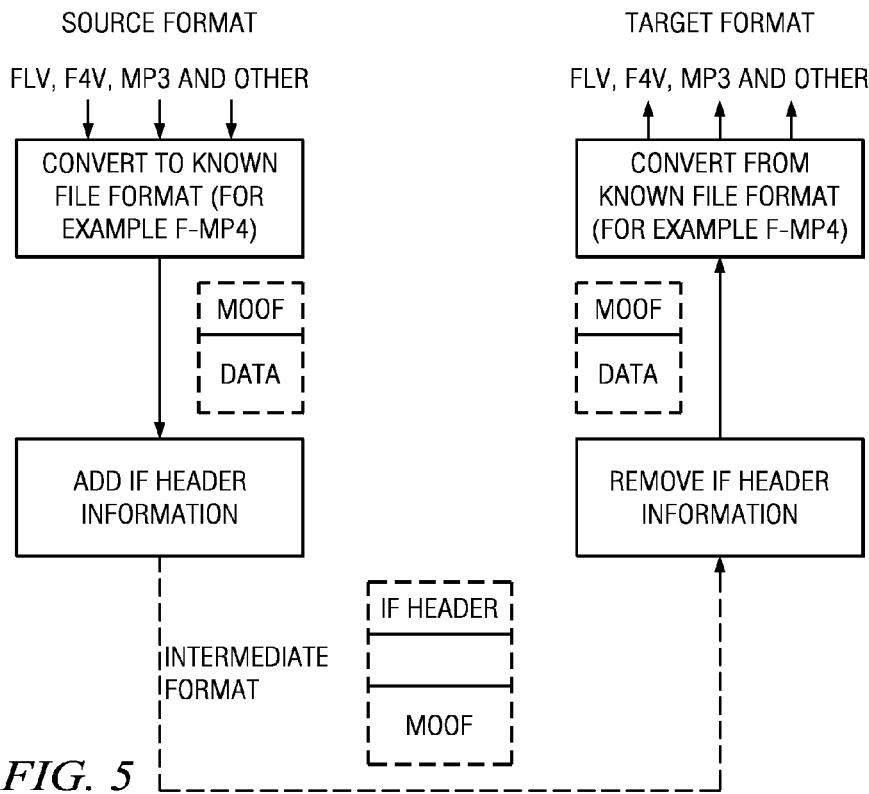
FIG. 5 illustrates a representative packet flow across the network of FIG. 3 from a source format (SF) to a target format (TF) using the Intermediate Fragments (IF) according to the disclosed technique.

FIG. 5 illustrates a representative packet flow from source format (SF) to target format (TF), although the conversion processes may be omitted (in other words, source format bits may be placed in the IF Fragment without additional format conversion). As noted above, preferably each video stream is broken into Fragments. Fragments are numbered consecutively starting at some arbitrary point (which can be determined by consulting the Fragment Index). The sequence may be discontinuous across Stream Manifest indexInfo ranges. Each Fragment preferably comprises header information describing the type of data enclosed. Following these headers are the IF payload, such as a sequence of FLV tags. A target format may also be just an encrypted form (such as based on AES 128) of the elemental audio/video streams.

The Fragment Indexes enable the HTTP proxy process (to which a particular Client has been associated) to find a frame around a desired "seek time." Preferably, each Fragment Index file contains index information covering a fixed amount of time. The exact interval is stored in the Stream Manifest for each indexInfo range. The desired seek time (epoch time) can be rounded down to the nearest interval boundary to find the Fragment Index to request.

Preferably, each stream is represented completely by the Stream Manifest, the Fragment Index and the IF Fragments. In an illustrative embodiment, the Stream Manifest is an XML file that contains the following information: stream epoch time (this time may be the time when the stream started or may be the oldest archived portion of the stream still available); stream Properties (like bit rate, video size, codec information, etc.); information about fragment indexes and which URL pattern to use to request FI file; and URL pattern for the fragments. The Fragment Index (FI) typically comprises the following: information about which key frame to start streaming from for a given time slice; key frame-to-fragment number mapping, key frame-to-time mapping, key frame to byte-offset in that fragment mapping, and so forth. Each IF Fragment contains approximately N seconds of stream, preferably optimized for HTTP proxy caching and not necessarily fragmented on time boundaries. Each fragment is composed of a fragment header, fragment stream header and a payload, and each fragment is uniquely identified by the fragment number. Fragment numbers incrementally increase.

Typically, and with reference back to FIG. 4, the Archiver 410 has the fragments for the most recent N minutes of the stream, and the rest of the fragments are on the Storage subsystem 416. The Archiver creates a Stream Manifest XML file for each stream. It puts all the necessary information that an HTTP proxy can use to make fragment and fragment index requests. For the Archiver to construct a Stream Manifest, preferably RTMP Puller sends the stream properties downstream. Preferably, the IF Fragment is used to serve time-related data, i.e. actual video/audio bytes. Also, preferably the HTTP proxy (to which the Client has been associated) makes requests for IF Fragments only. Thus, it is desirable to isolate fragments from packets that have stream properties.

The Muxer subsystem 415 associated with (or within) the HTTP proxy determines how to request IF, converts IF to the output stream, and passes this data to the HTTP proxy for serving to the requesting client. In addition, preferably the HTTP proxy process supports a control channel by which the client can make any combination of various requests against an active stream including, without limitation, sessionToken, seek, and switch. The control channel facilitates flow control when working in some runtime environments, such as where the client lacks its own flow control facilities. In this situation, the control channel passes throttle commands that may be based on a percentage of an average bit rate (over the server-to-client connection) to help maintain full a target buffer on the client side of the connection. A sessionToken request is a request to provide additional authentication information, e.g., via SWF Authentication. A "seek" is a request to start sending data as of a different time in the stream (including "jump to live"). A "switch" is a request to start sending data from a different track from the same Stream Manifest. This might be a bit rate switch and/or an angle change.

Thus, the HTTP proxy receives DVR commands from the client player, preferably on a separate HTTP connection. When the client player requests that playback begin from a new stream position, the HTTP proxy uses metadata from the Stream Manifest file to calculate which FI file contains the target time offset. The FI file is retrieved (e.g., from the Archiver or the Storage subsystem, or from a peer machine) and contains the IF fragment and byte offset to begin streaming to the client player.

As described, the Stream Manifest preferably is an XML file and contains information about fragment indexes and how to construct the URL for an FI file, how to construct the URL for the "now" request, and how to construct the URL for the fragments. The HTTP proxy caches the manifest, which can be retrieved to the proxy either from an Archiver (which may be tried first), or the Storage subsystem. Client players connect to the HTTP proxy to play the live stream (i.e., connect to the stream's "now" time). In response, the HTTP proxy makes a forward request to the Archiver to fetch the "now" time on a live stream. Metadata in the Stream Manifest is used by the HTTP proxy to create the "now" URL.

As also described, a stream has a number of FI files. Each contains stream keyframe information for a given time slice. The Fragment Index allows time offsets to be mapped to fragment numbers and byte offsets. The Stream Manifest file defines the time slice for each FI file.

Each IF Fragment contains approximately N seconds of a stream. Each fragment is composed of a header and a payload. The HTTP proxy understands the data in the header, but the payload is opaque. The HTTP proxy links together with a Muxer component to convert the IF-formatted payload to the target format that is streamed to the client player. The fragments are cached in the HTTP proxy for re-use, and each fragment is identified with its stream name and an integer suffix that increases incrementally. As described above, Archiver has the fragments for the most recent N minutes of the stream, and the rest of the fragments are on the Storage subsystem.

For non-authenticated content, preferably the client player connects to an http://URL to play a stream. Query string parameters can be used to request a particular seek time if the default (live if the stream is live, or the beginning of the stream if it is not live) is not appropriate. For authenticated content, preferably the original http://URL additionally contains a shared authentication token query string parameter generated by the customer origin. This enables the HTTP proxy process to serve the stream for some configured amount of time (e.g. a given number of seconds). After that time, the HTTP proxy process terminates the connection unless, for example, an out-of-band control POST is received with a signed "session token." Although not meant to be limiting, in one approach this token preferably is generated by the client by connecting to an FMS (or equivalent) edge machine that can perform SWF Verification (as shown in FIG. 3). The machine returns the signed session token to the client to be forwarded back to the HTTP proxy process as a control channel POST. Once the session token is received by the HTTP proxy, the stream preferably will play indefinitely. Other types of stream authentication may be implemented as well.

Figure 6:
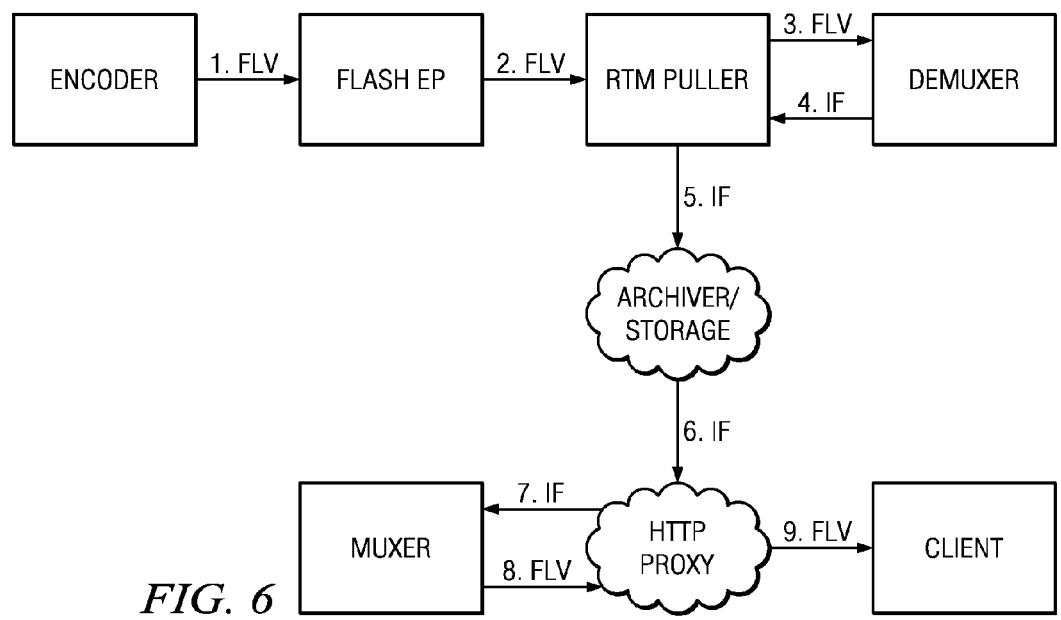
FIG. 6 illustrates another view of the flow of media packets into and out of the streaming server framework.

FIG. 6 is another view of the flow of the media packets into and out of the streaming server framework of this disclosure for live streaming. As noted above, the framework processes (demuxes) the incoming media packets into an intermediate format (IF). In particular, the Encoder pushes the CDN customer content into an Entry Point. The Puller then pulls the content from the EP and passes the data to its associated Demuxer, which converts the incoming source format (SF, such as FLV) to IF fragments before injecting them into the Archiver network. An Archiver receives data from the RTMP Puller and incrementally writes this data to memory, such as a RAM disk (or other data store). If the HTTP proxy (to which a Client has been associated) requests a Fragment or Fragment Index that is currently in the process of being received from the Puller, the Archiver sends the response (preferably in a chunk-encoded HTTP response) so that the data can be sent as soon as it is received. Once a Fragment or Fragment Index is complete, a designated leader Archiver (selected via a leader election process) attempts to upload the resulting file to the Storage subsystem. As noted above, the muxer component associated with the edge region/server processes (muxes) the packets to the desired target format (TF) before the packets reach the end clients.

A Demuxer process may be integral to the Puller; likewise, a Muxer process may be integral to the HTTP proxy process. There may be one Demuxer process for multiple Pullers; there may be one Muxer process for multiple HTTP proxies (within a particular Region).

As noted above, in terms of functionality, Demuxer converts regular stream packets into IF fragments and Muxer does the opposite. By definition, Demuxer and Muxer should complement each other. As noted, Demuxer can be part of an RTMP Puller process or can be a separate process running on the RTMP Puller machine. Demuxer receives input via the RTMP Puller. It is responsible to do the following: generate IF Fragment Header, take the source format and package the same into IF body, add Fragment Stream Header, Push IF fragment to Archiver, analyze the fragment and generate index information pertinent to key frame location within a given FLV packet, Push Key frame information to the Archiver. This can be done synchronously/asynchronously with respect to the IF fragment transmission. Preferably, Demuxer also is responsible for determining an optimal size of the fragment, which fragment size should be optimal for HTTP proxy caching. Demuxer can base its decision (regarding the optimal size of the fragment) by examining the following stream properties: incoming live stream byte rate/bit rate; Key Frame Interval, or a combination of both. Apart from constructing IF Fragments, Demuxer is also responsible to push Stream Properties and key frame information to the Archiver. Archiver can then create the Stream Manifest file that will be used by the HTTP proxy/Muxer to make fragment index and individual fragment requests. As described above, Muxer complements Demuxer. As Demuxer is responsible for constructing IF Fragments, Muxer is responsible for deconstructing the IF Fragments and converting the IF Payload format to the target format (TF) that the Client requested. The Muxer may also provide the following information to the HTTP proxy: statistics information about HTTP delivered Streams; and client session playback Information, such as playback duration, etc., and Muxer health data.

The Demuxer and Muxer enable dynamic transmux output to other file formats. This enables the system to leverage a single set of content sources for different device capabilities, e.g., iPhone 3.0 streaming using MPEG-2 TS Segments, Microsoft Silverlight 3 (with H.264 playback), Shoutcast, and so forth.

As a variant to the above-described "pull" model that operates between an Encoder and an Archiver, it is also possible to use a "push-based" approach.

Video on Demand (VOD) Delivery

The above-described architecture is useful for live streaming, particularly over formats such as Flash. The following section describes adding video on demand (VOD) support to the platform. In particular, the solution described below provides VOD streaming from customer and Storage subsystem-based origins, provides single and multiple bitrate (SBR and MBR) streaming, provides support for origin content stored in flv and mp4/flv containers (supported mp4/flv codes include, among others, AAC, MP3, PCM for audio, and H.264 for video), and minimizes download of content beyond what is directly requested by the end user.

For VOD delivery, the stream recorder tier 300 (of FIG. 3) is replaced, preferably with a translation tier, as will be described. For VOD delivery using HTTP, the Fragment Indexes may be generated from the origin content on-the-fly (e.g., by scanning FLV or parsing MP4 MOOV atoms) and caching these indexes. Actual data retrievals may then be implemented as "partial object caching" (POC) retrievals directly from source material at the edge region or via an intermediate translation (e.g., by a cache-h parent) into an Intermediate Format. As used herein, partial object caching refers to the ability of an HTTP proxy to fetch a content object in fragments only as needed rather than downloading the entire content object. The HTTP proxy can cache these fragments for future use rather than having to release them after being served from the proxy. An origin server from which the content object fragments are retrieved in this manner must support the use of HTTP Range requests.

Before describing a VOD implementation in detail, the following section describes several ways in which VOD content is off-loaded for HTTP delivery to the CDN. In a first embodiment, a conversion tool (a script) is used to convert source content flv to IF, with the resulting IF files then uploaded to the Storage subsystem. In this approach, metadata is used to have an HTTP proxy go forward to the Storage subsystem to retrieve the stream manifest, which then references the Storage subsystem for the remaining content. In this approach, files in mp4/flv are first converted to flv (e.g., using ffmpeg copy mode) to change the container to flv. Another approach is to have a CDN customer upload raw media files to the Storage subsystem and to run a conversion tool there. Yet another alternative is to have the customer (or encoder) produce content in IF directly.

The translation tier approach is now described. In this approach, an on-demand dynamic IF generator machine takes requests for IF (manifests, indexes, and fragments) and satisfies these requests by dynamically retrieving flv or mp4/f4v input file ranges (either from the Storage subsystem or customer origin). From there, HTTP proxy treatment is essentially the same as the "conversion tool" options described above. The generator machine preferably runs its own HTTP proxy (the "translator HTTP proxy") to cache various inputs and outputs, together with a translator process (described below) that accepts requests (e.g., from a localhost connection to the translator HTTP proxy) and generates IF based on data retrieved from the HTTP proxy via an associated cache process. In an alternative, the translator process may comprise part of the translator HTTP proxy, in which case IF generation takes place within the proxy. Fragment generation may also be carried out in an edge machine HTTP proxy or even further downstream (into the Client itself), such as where a Client maintains a session connection with one or more peer clients.

An architecture and request flow of a preferred approach is shown in FIG. 7. In this embodiment, which is merely representative and non-limiting, a translation tier 700 is located between an origin 702 (e.g., customer origin, or the Storage subsystem, or both) and the stream player tier 704. In a representative embodiment, the translation tier executes in its own portion (e.g., a Microsoft IIS or equivalent network) within the CDN, preferably in a Region dedicated to this purpose. Alternatively, a translator (as described below) may run on a subset of HTTP-based edge machine Regions.

FIG. 8 illustrates a representative translator machine 800. This machine, like the machine shown in FIG. 2, includes CPU, memory, disk store and network interfaces to provide an Internet-accessible machine. In addition, as shown in FIG. 8, in this embodiment, the two main components of the translator machine comprise the HTTP proxy 802, and a translator process 804. The HTTP proxy 802 performs partial object caching (POC) and interacts with the translator process 804, which generates the stream manifest, index and fragments. The proxy and translator components interface to one another via shared memory 806 and a stream cache process 808, described in more detail below. The operation of the translation machine is best provided by way of an example. The following section describes the request flow from client to origin for a single bit rate (SBR) stream request, and how the components described above facilitate this process. Example URLs are provided.

As used below, "C" refers to the Client, "EG" refers to an edge machine HTTP proxy, "TG" refers to a translator machine HTTP proxy (such as proxy 802 in FIG. 8), 'T' refers to the translator process (such as process 804 in FIG. 8), and "O" refers to origin (which may be a customer origin or the CDN Storage subsystem).

C→EG:

The process begins when a Client makes a request to the edge machine HTTP proxy for the desired content. A representative URL might be as follows:

URL: http://efvod.customer.com.akamaihd.net/foo/bar/baz.mp4

EG→itself:

The EG HTTP proxy then matches on the request pattern, and sets a number of parameters, such as "event," "angle," "bitrate," and "streamed." The actual pathname is the "event," and the "streamid" identifies a customer configuration associated with the request.

EG→TG:

The EG HTTP proxy then goes forward to retrieve the Stream Manifest from a translator machine; preferably, the HTTP proxy goes forward by providing a metadata-configured hostname (to the CDN DNS) that resolves to addresses associated with the translator machines. Preferably, the request path is prefixed with a customer identifier and protected by a per-customer secret, e.g., based on an authentication mechanism that operates between HTTP proxies. A representative URL might be as follows: http://translator.customer.com.akamaihd.net/custidl/translate/foo/bar/b az.mp4?object-manifest

TG→T

If the translator HTTP proxy has already produced the Stream Manifest (or can find it, e.g., via ICP), the Manifest is returned to the edge HTTP proxy that requested it. Otherwise, the translator HTTP proxy itself goes forward to localhost to retrieve the manifest. Preferably, the customer identifier prefix is preserved. The translator HTTP proxy may also apply one or more host headers on the manifest request (to the translator process) that are then echoed back to the translator HTTP proxy in any requests for origin content, metaindexes, etc. Preferably, all TG↔T interactions carry these same headers. These headers ensure that the translator HTTP proxy is only fulfilling requests for the proper customer, and also to facilitate load balancing. The translator requests may also be authenticated using a cookie and a per-customer secret. A representative URL might be as follows: http://translator.customer.com.akamaihd.net/custidl/translate/foo/bar/b az.mp4?object-manifest
Forward IP/port: 127.0.0.1:yyyy

T→TG:

The translator in turn retrieves the "metaindex" for the stream from the translator HTTP proxy using the stream cache process and the cookie. (To produce a manifest, typically only the beginning of the metaindex is retrieved.) The translator applies the customer-specific secret (from the original request) to the metaindex request back to the HTTP proxy. With the information in the "metaindex," the translator produces the Stream Manifest. A representative URL is as follows: http://translator.customer.com.akamaihd.net/custidl/metaindex/foo/bar/b az.mp4&format-mp4
Forward IP/port: 127.0.0.1:80

TG→T:

If the translator HTTP proxy does not have the metaindex already cached, it again goes forward to the translator (same procedure as for the Manifest). A representative URL is as follows: http://translator.customer.com.akamaihd.net/custidl/metaindex/foo/bar/b az.mp4&format-mp4
Forward IP/port: 127.0.0.1:yyyy

T→TG:

When the translator receives the request for the metaindex, it retrieves (via the stream cache process using same procedure as above for the Manifest) a small subset of the original content, which the translator HTTP proxy is able to retrieve from origin, preferably using partial object caching (POC). For fly files, preferably only the very beginning and the last block will be read. For mp4/f4v files, preferably the "moov" atom at the beginning of the file is processed in its entirety. A customer-specific prefix and secret preferably are passed along this entire path. A representative URL is as follows: http://translator.customer.com.akamaihd.net/custidl/origin/foo/bar/baz. mp4
Forward IP/port: 127.0.0.1:80

TG→O:

The translator HTTP proxy ultimately goes forward to the appropriate origin on POC misses. A representative URL is as follows:
URL: http://some.origin.com/some/customer/prefix/foo/bar/baz.mp4

EG→TG→ . . . →O:

At this point, the edge machine HTTP proxy has a manifest and needs an index. The edge machine HTTP proxy again goes forward to the translator for the index. The process proceeds in essentially the same way as for the Manifest. For "mp4/f4v" files, preferably all indexes are pre-computed and stored verbatim in the metaindex so that no mp4/f4v content access is required. This is not a requirement, however. For "flv" files, producing full index information typically requires reading the entire file; thus, for this type of content, preferably small indexes (e.g., each a few seconds) are generated, e.g., using a binary search over the fly content and then downloading only that window of content. The forward request from the HTTP proxy (as specified in the Stream Manifest) may be as follows: http://translator.customer.com.akamaihd.net/custidl/translate/foo/bar/b az.mp4?object-index&number-1234&etag-3-1234567890ab
Additional query-string parameters may be passed from the manifest back to the index or fragment requests to ensure consistency between any parameters that might have changed between manifest generation and index/fragment retrieval.

EG→TG→ . . . →O:

The final type of request is for the actual fragment. For mp4/f4v files, the metaindex includes instructions sufficient to produce any requested IF fragment without reparsing or otherwise consulting the original "moov" atom. Preferably, the actual raw data is retrieved via POC and/or the stream cache process and assembled into valid IF fragments. For fly files, the fragment is generated by seeking directly to "desired_fragment_size*(fragment_number-1)" and then scanning forward for the first valid fly tag. The end of the fragment is just the first tag boundary at or after file offset "desired_fragment_size*(fragment_number)". A representative URL is as follows: http://translator.customer.com.akamaihd.net/custidl/translate/foo/bar/b az.mp4?object-fragment&number-1234&etag-3-1234567890ab This completes the description of the client to origin request flow for an SBR stream request. The following provides additional details regarding the VOD implementation.

The metaindex is a binary format preferably comprising several sections, preferably in the following order: (i) fixed-size global header with per-stream information; (ii) additional "content-verifier" information, e.g., ETags, used to identify which file has been indexed; (iii) an "onMetaData" tag for the stream; (iv) per-track information, including fly codec identifier and optional codec configuration parameters required by AAC and H.264; (v) (mp4/f4v only) Lookup table to map fragment numbers to "sample_info" below; (vi) (mp4/f4v only) IF Indexes; (vii) (mp4/f4v only) "sample_info" which describes each individual sample to be interleaved into the output. The "sample_info" essentially is an optimized version of the "moov" atom that abstracts out many of the complexities of the mpeg-4 container. In general, this should be a fairly compact representation, often smaller than the corresponding "moov" atom.

A Stream Manifest may include all bitrates of a multi-bit rate (MBR) stream. To produce an MBR Stream Manifest, the manifest request may reference an SMIL file, which in turn contains the individual bitrates and fly or mp4/f4v source files. For MBR delivery, to produce the actual manifest the translator downloads metaindexes for each bitrate. The index and fragment requests only require the metaindex file for the particular bitrate(s) that the edge machine HTTP proxy wants to play. MBR fragment and index requests are similar to their SBR counterparts, except they also include an "smil= . . . " query-string argument added to each path in the C→EG→TG→T chain via patterns in a <locationInfo> tag in the manifest.

Preferably, the actual format ("mp4" vs. "flv") is included in metaindex, fragment, and index URLs as a "format" query string argument.

As noted above, IF generation can take place within or in association with the HTTP proxy, including even an edge machine. This enables the creation of content at the edge itself, close to the requesting end user. Indeed, this approach (of IF generation in or in association with the HTTP proxy) can move even further downstream, namely, into the client machine itself. This is possible if the client includes software that facilitates peer-based network session connectivity to a peer-to-peer (P2P) network, at least some portion of which is based on CDN resources including edge machines running HTTP proxies. As noted above, it is possible the IF is generated in an HTTP proxy (or in a Muxer process associated therewith). When such P2P network session software executes within a Client, it is possible to extend the HTTP proxy interface all the way downstream to the Client machine itself. In this approach, muxing takes place in the Client itself, in which case the edge machine becomes just a "parent" cache in a cache-hierarchy that includes the client-side delivery mechanism. This approach could also be used with mobile devices with limited bandwidth.

Multiple Bitrate Delivery Tier

The above-described embodiments provide a format-agnostic streaming architecture that utilizes an HTTP edge network for object delivery. The following section provides additional details regarding support for multiple bitrate technologies within a tier of the architecture.

Enabling technologies that provide multiple bitrate adaptive streaming are known, and these technologies may be used in the streaming architecture, as is now described.

A representative multiple bitrate adaptive streaming technology is based on Microsoft Internet Information Services (IIS), which includes Microsoft Silverlight. In particular, Microsoft's HTTP server, IIS 7, supports chunked, adaptive streaming over HTTP protocol with a Microsoft Silverlight-based media player. The bitrate is varied dynamically during playback based on various factors like available bandwidth, client resources and rendering performance. The chunks are created by IIS dynamically from complete multiple-bitrate files (one file per-bitrate) encoded by Microsoft's Expression Encoder. Expression Encoder encodes content into multiple ISMV files (one per-QualityLevel/bitrate). It also creates two (2) Manifest files (client manifest and server manifest). These manifests and ISMV files are input to IIS. In operation, the Silverlight client player first fetches the client manifest, which has index-data on the chunks for each QualityLevel. It then requests the corresponding chunk for the appropriate QualityLevel based on various parameters like available bandwidth, network conditions and local machine resources. IIS creates virtual chunks from the ISMV file for that QualityLevel. Each chunk is a complete, cacheable HTTP object. The default duration for each chunk is a given time period in seconds (keyframe interval), such as 2 seconds. Video and audio are represented as two different chunks. The container format for the ISMV files is fragmented-MP4, and these fragments are used to create chunks dynamically by IIS.

For live streaming, a stream is delivered to a server URL of the form: {protocol}://{server address}/{publishing point path}/stream({identifier}), where:
 {protocol}: "http" or "https"
 {server address}: target server
 {publishing point path}: absolute path of the of publishing point on the server, which must end in the extension ".isml"
 {identifier}: unique name for each stream posted—typically it is the bitrate A Live Server Manifest is provided to the server by the encoder, and it is used to enable the server to interpret the incoming live stream, assign appropriate semantic meaning to the tracks in the stream, and to create a Client Manifest that conveys the parameters necessary to decode the data and make appropriate heuristic decisions. Playback is by each client requesting the client manifest once, and it uses incremental information in the fragments to fetch next fragments. Publishing points are configured on the server by creating isml files at the appropriate location (starting at server root). Every publishing point transitions through a common set of states throughout its lifetime before returning to the shutdown state.

For on-demand streaming, typically the encoder provides one ISMV file per-bitrate, and the two manifest files (client and server). The IIS returns the client manifest initially, and then the player requests a series of chunk URLs. The chunk timeslice is in units of x nanoseconds. The chunk interval is roughly two (2) seconds, as noted above. Because the timeslices are from the client manifest, end-users use the same timeslice values for given content.

Live

Figure 9:
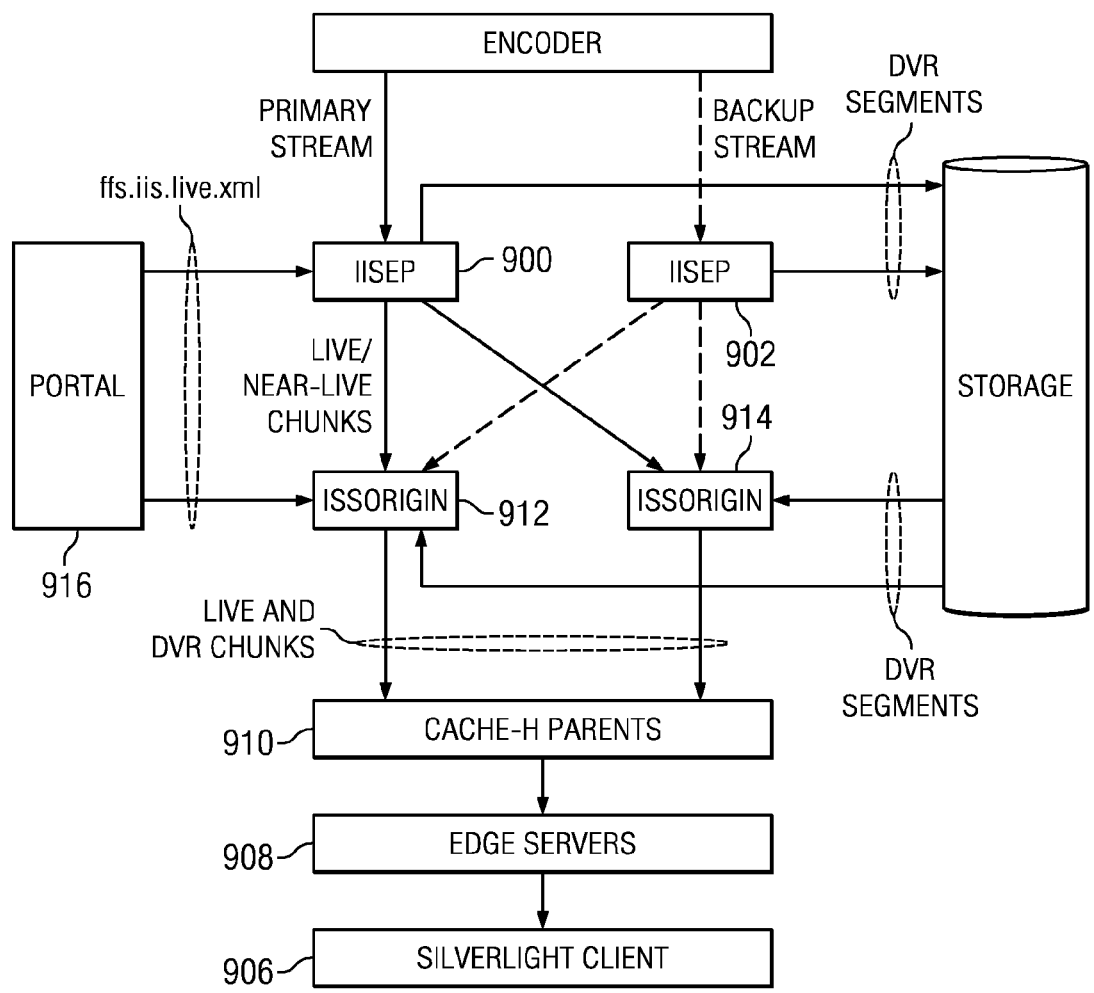
FIG. 9 illustrates an embodiment for live streaming using an IIS-based middle tier.
Figure 10:
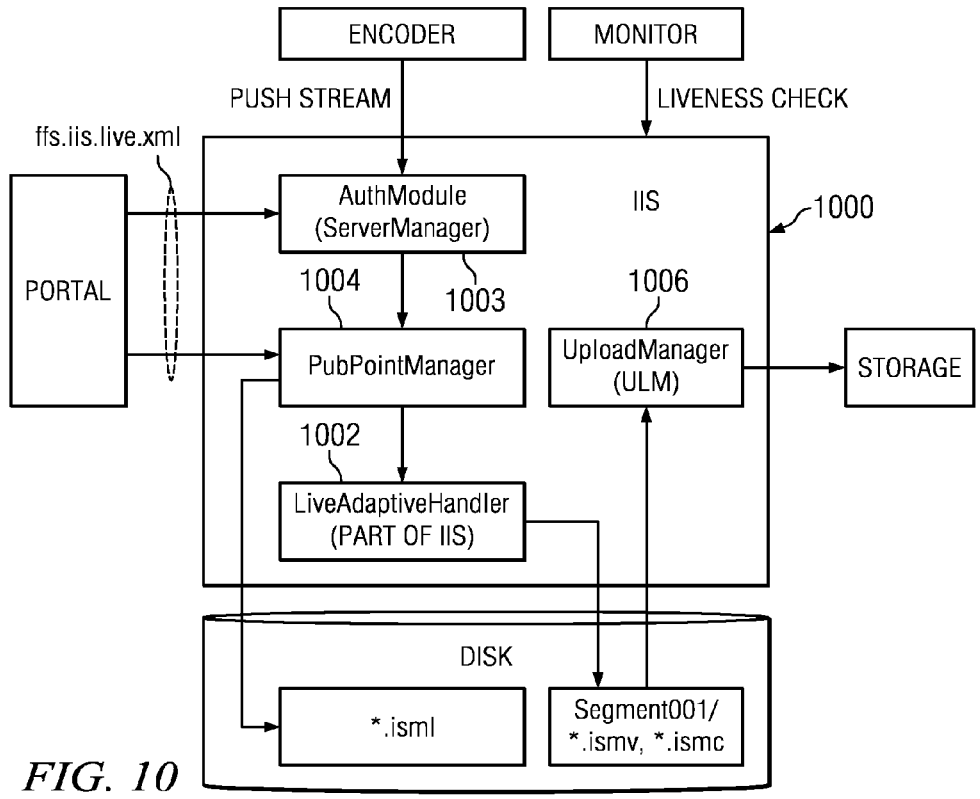
FIG. 10 illustrates one of the IIS-based entry points shown in FIG. 9.
Figure 11:
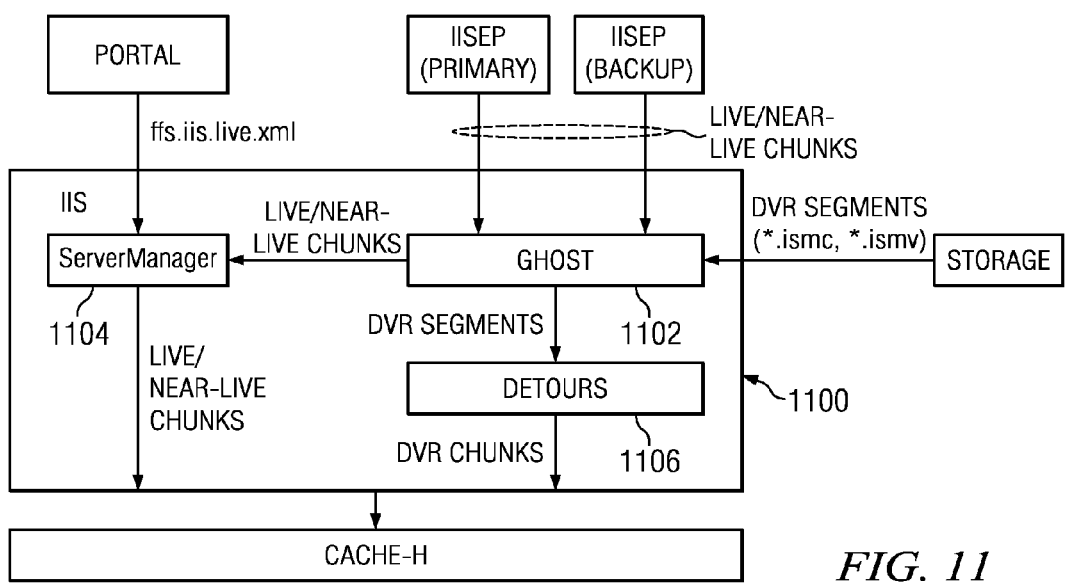
FIG. 11 illustrates one of the IIS-based origin server machines shown in FIG. 9.

A high level design to provide multiple bitrate adaptive streaming over Microsoft IIS enabling technologies is shown in FIGS. 9-11.

As shown in FIG. 9, the recording tier in this embodiment comprises IIS-based entry point machines (IIS EP) 900 and 902, each of which receives the stream from the encoder 904. The player tier comprises end users each running the Silverlight client 906, the CDN edge servers 908 and, if desired, the cache hierarchy servers 910. An IIS middle-tier comprises IIS origin machines 912 and 914 (each an IIS ORIGIN). In addition, a portal 916 is available for provisioning the system.

FIG. 10 illustrates one of the IIS-based entry points, such as IIS EP 900 in FIG. 9. An IIS EP is built on an IIS. In particular, the IIS EP 1000 includes a LiveAdaptive Handler process 1002 for managing the multiple bitrate adaptive streaming. This process is native to the IIS server. In addition, the IIS EP machine also includes, preferably as IIS plug-ins, an authentication module 1003, a publishing point manager 1004, and an upload manager (ULM) 1006.

FIG. 11 illustrates one of the IIS-based origin server machines, such as the IIS origin 912 in FIG. 9. The reference to "ISS" in this context merely indicates that the machine is used in the IIS-based implementation, not necessarily that the machine uses IIS. In this embodiment, the IIS ORIGIN does not run IIS (or include the LiveAdaptive handler), but rather is a set of components provisioned by the CDN service provider. In particular, the IIS origin 1100 comprises a CDN edge server cache process 1102, such as described above, a new server manager process 1104, and a process referred to as Detours 1106. The functions provided by the processes are explained below.

IIS EP performs the role of entry point (EP) for the adaptive live streams. This machine runs IIS, preferably with its LiveAdaptive handler 1002 enabled. As noted above, IIS EP includes plugs-in to support the following functions: encoder authentication, publishing point (pub-point) management, and DVR archive upload to the CDN storage system (Storage). Preferably, a live stream is archived to disk in short segments (e.g., 30 seconds). As soon as a segment is written to disk, the upload manager 1006 uploads the segment's files to Storage. After some overlap period (e.g., 10 minutes—to allow for upload and replication), IIS is configured to delete the uploaded segment on IIS EP's disk. Preferably, an encoder→EP mapping is based on a static hostname created via the portal 916, which preferably is a secure customer-facing extranet application.

The following provides additional details regarding the CDN-sourced modules supported on the IIS EP machine. These modules may be implemented as separate modules or in a single ServerMgr DLL. The authentication module 1003 is the gatekeeper for encoder connections. Preferably, it implements HTTP digest authentication. The publishing point manager 1004 manages publishing points dynamically upon encoder connect/disconnect. Preferably, IIS RSCA (Runtime State and Control) API is used to control publishing points. On encoder connect, the publishing point manager 1004 creates a publishing point dynamically; on disconnect, the publishing point is deleted. A similar publishing point is created on the backup EP when the encoder connects with the backup stream. Preferably, archives are uploaded to Storage from the backup EP, although this is not a limitation. The upload manager 1006 monitors DVR segments archived on disk, and it uploads them to Storage. The upload manager 1006 may also upload the current client manifest for the live stream. Preferably, a new session (based on timestamp) is created per-encoder connector. Similar pub-point is created on backup EP when encoder connects with backup stream. Archives are uploaded to NS from the backup EP.

The portal 916 pushes provisioned stream information (e.g., streamid, stream type, encoder user/password, archive location on Storage, and so forth) to both IIS EP and IIS ORIGIN through a transport channel, such as described in U.S. Pat. No. 7,111,057. The portal may also pick an EP based on latency to encoder and existing streams on the EP. As noted above, the publishing point manager 1004 running on IIS EP creates publishing points (isml file) dynamically when the encoder connects to EP. Preferably, a DVR disk path is distributed across available disks on EP. On a single streamid, the encoder pushes the stream with any stream name (one stream at a time per-streamid). Typically, the backup stream is a separate stream and has a different streamid. A client-side playlist is used to rollover from primary to backup.

The following are preferred semantics of streamid and streamname: streamid is a number and streamname is an alphanumeric string. The streamid is provisioned in the portal 916, and streamname may be picked by the customer while pushing the stream. There is no provisioning required for streamname. The publishing-point relative path may be <stream-id>/<streamname>.isml. Preferably, the publishing point is dynamically created when the encoder connects. The CDN customer can reuse the same streamid for different, non-overlapping events. By using streamed+streamname combination, randomness is introduced in the stream/pub-point name. In addition, this construct gives the customer control over the publishing point.

If an EP machine goes down, the portal detects this failure and re-provisions all streams on the down EP to a new EP. The encoder then reconnects to the new EP machine. DVR archive upload continues from the new EP.

Referring to FIG. 11, the server manager 1104 intercepts live requests and answers them with content from IIS EP (for live/near-live) 1108 or Storage 1110 (for DVR) appropriately. In particular, the server manager 1104 fetches the client manifest and keeps it current on the IIS ORIGIN machine to enable the system to determine if a chunk is likely to be present on IIS EP or Storage, as the case may be. The process 1102 is used to fetch both live and DVR chunks.

Referring back to FIG. 11, the server manager 1104 preferably handles live requests from CDN servers in the cache hierarchy. (The use of the cache hierarchy is not required). The server manager 1104 also fetches and maintain a merged version of the client manifest from both EP and Storage archive location (because the EP manifest version has only a last several minutes worth of chunk information depending on the size of the manifest window). If a request timestamp is within a time period (e.g., 5 minutes) of the last chunk's timestamp in the client manifest, the process 1102 fetches chunk from IIS EP. If, however, the request timestamp is older than the time period, the process 1102 fetches the chunk from the Storage archive location for that stream. To handle this latter operation, preferably the live request (*.isml) URL is rewritten to an on-demand URL (*.ism) with the appropriate Segment location in Storage. The index files on Storage are used to find the appropriate Segment mapping for the request timestamp. Partial object caching (POC) is enabled for the segmented ismv files.

On-Demand

Figure 12:
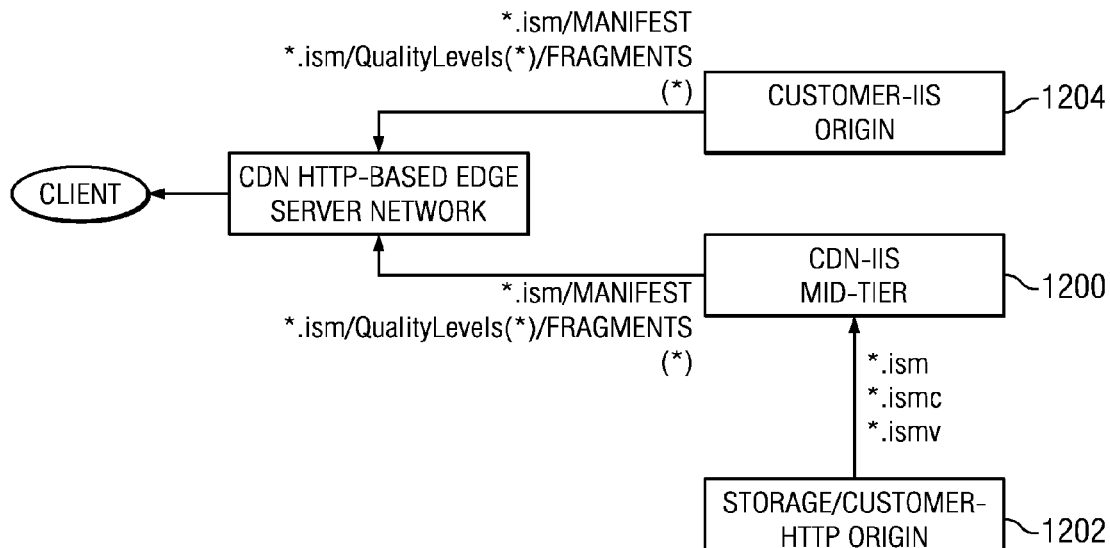
FIG. 12 illustrates an embodiment for on-demand streaming using an IIS-based middle tier.

As illustrated in FIG. 12, a network tier of IIS machines (called "iis") 1200 is deployed within the context of a CDN. This network acts as middle-tier and preferably is not end-user facing. For origin, these IIS machines 1200 support Storage 1202 and customer-HTTP servers 1204. A particular machine 1200 may be configured as described above with respect to FIG. 2.

Figure 13:
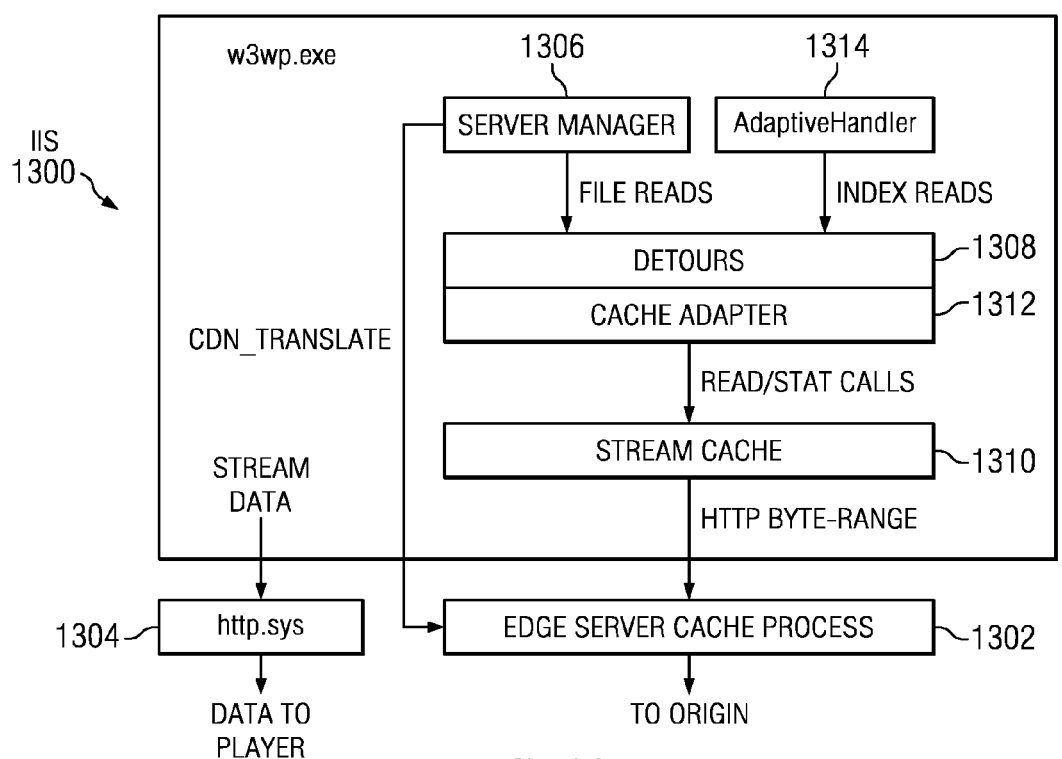
FIG. 13 illustrates one of the IIS-based mid-tier machines shown in FIG. 12.

FIG. 13 illustrates a representative IIS machine. Because IIS 7 runs on Windows 2008, the IIS machine uses WinOS 4.0. This machine runs an instance of IIS 1300, in association with a set of CDN-provided components, including the edge server process 1302. The process http.sys 1304 is a Windows kernel-mode component responsible for network transmission. ISS uses the http.sys interface for efficient processing and sending of adaptive streaming stream data. It also provides kernel-mode caching of the data. FIG. 13 also shows a set of CDN components that support the installation and runtime environment. They include: a server manager 1306, which is an IIS plugin that oversees and manages the HTTP request, a detours process 1308, which intercepts streaming file requests to disk and redirects the requests to a stream cache 1310 and the edge server process 1302. A cache adapter 1312 bridges the interfaces between the stream cache 1310 and the detours process 1308 so that the detours process can use the cache. A configuration module (not shown) is provided for installing and activating these CDN-supplied components. The edge server process 1302 is used to cache ISMV files fetched from Storage or customer origin. The stream cache 1310 and edge server process 1302 use shared memory to return the ISMV file data.

IIS supports a module-API to extend its core functionality. A request-level-HTTP module on IIS can register for certain events and it will be invoked during the chunk request processing for each request. The adaptive/smooth streaming support in IIS is provided by Microsoft's AdaptiveHandler 1314, which is part of IIS Media Pack. Handlers on IIS are invoked based on file extensions (e.g., the AdaptiveHandler 1314 would register for *.ism files). Worker processes (w3wp) are spawned by IIS for handling requests, while the core IIS process handles high-level functions (like configuration management).

The following is the basic dataflow when a chunk request hits IIS (for basic IIS serving files from disk without CDN integration). The IIS spawns w3wp (if it is not running. The worker process w3wp routes the request to the appropriate handler (namely, AdaptiveHandler 1314). The Adaptive-Handler 1314 reads the server-manifest, client-manifest and index data from ismv files. Using the index data read, the AdaptiveHandler seeks the appropriate offset in the relevant ISMV file for the bitrate requested in the chunk request. The AdaptiveHandler then passes the ISMV file handle, offset and bytes-to-be-transferred to the http.sys process 1304. The http.sys process looks up the file data directly (e.g., in operating system buffer-cache, or reads it from disk if needed), and sends it over the wire.

With CDN support modules, however, the above-described operation is modified as follows. In particular, to interface with Storage or customer-origin, the combination of the detours process 1308 and the server manager 1306 operate to intercept calls, and to read data from the edge server process 1302.

The following is a representative dataflow of chunk-request-processing with CDN integration according to this disclosure. IIS spawns w3wp (if not already running). The w3wp process routes the request to the appropriate handler (once again, the AdaptiveHandler). The server manager 1306 execute-handler event callback is then invoked, which will do a CDN_TRANSLATE to rewrite the URL. The AdaptiveHandler reads the server-manifest, the client-manifest and index data from ISMV files. The detours process 1308 hooks into the worker (w3wp), and it intercepts the file-accesses, routing the file-reads to the edge server process 1302. Using index data read, the AdaptiveHandler seeks the appropriate offset in the relevant ISMV file. The server manager's post-execute-handler event callback is invoked before the AdaptiveHandler sends the response back to the worker process. The server manager uses the file-handle, offset information in the HTTP response object, and file system calls, to read the same data from the ISMV file. The detours process intercepts the file accesses made by the server manager and uses the edge server process to read the data. The server manager then passes the HTTP response back to the worker process, which response is then routed to http.sys. The server manager's onAsyncCompletion event callback is invoked after the send is completed. For a chunk request that is a cache hit, the above processing is the same with two modifications. If there is a cache hit in the http.sys cache, the hit is served directly from that cache, and this operation occurs before the w3wp process would otherwise route the request to the AdaptiveHandler.

For end user requests, the server manager 1306 verifies that the request is coming from an edge server process (that is equivalent to the process 1302), translates an associated CNAME into a CDN-specific resource locator, and makes file read calls to obtain the streaming content. The server manager 1306 performs a TRANSLATE by sending the request to the local edge server process 1302. This TRANSLATE request applies customer-specific metadata.

The server manager 1306 is responsible for fetching data chunks for the requested adaptive stream. From the request URL, and after reading the index of the file, AdaptiveHandler computes the number of bytes to fetch from the file and the starting offset. Then, as part of an Http response, the AdaptiveHandler passes the file handle (that it receives from the detours process 1308) along with the byte range information.

The server manager 1306 also registers for post-execute request events. Therefore, IIS 7 invokes the server manager 1306 immediately after the AdaptiveHandler finishes execution. The server manager 1306 iterates through the Http Response to obtain the file handle and the byte range information to get the requested data. It makes a ReadFile Win32 call with the retrieved file handle. The detours process 1308 intercepts this call and maps the file handle to the actual file URL. Then, the detours process 1308 calls an exported stream cache 1310 read call to get the desired bytes. After receiving the bytes from stream cache 1310, the detours process 1308 returns these bytes to the server manager 1306. The server manager clears the Http Response, to which the AdaptiveHandler added the file handle and byte range information, and copies the data bytes as a data blob to the Http Response. The server manager 1306 also adds appropriate Http Response headers to identify the content type and length. Preferably, the server manager 1306 is only invoked for the following file extension requests: ".ism" (server manifest), ".ismc" (client manifest), and ".ismv" (data file). For all other extensions, the server manager may deny the request or return an error.

The IIS 7 server allows output caching in user mode and kernel mode. By default, AdaptiveHandler caches only client manifest (*.ismc file) both in user and kernel mode with a given TTL. This behavior can be dynamically configured either by changing the AdaptiveHandler configuration, or by leveraging IIS 7 APIs to modify this behavior (which is possible because the output caching is set AdaptiveHandler, and because the server manager is called after AdaptiveHandler execution). With kernel mode caching enabled, any adaptive content request coming to IIS is first intercepted by the http.sys driver. If the response of the requested content is available in kernel cache and the response has not yet expired, this request is served by http.sys directly, i.e., without interacting with other IIS components. In this case, this request will not be visible to the CDN IIS modules (and, in particular, the detours process). But, because the AdaptiveHandler allows caching of only client manifest (files with *.ismc extension), all other data requests are served by the CDN IIS modules, as has been described above. With only user mode caching enabled, http.sys passes the request to the IIS request processing pipeline. These requests pass through at least the authorization modules. AdaptiveHandler and the detours process do not intercept these requests if the response is available in user mode cache.

Although not illustrated, the cache hierarchy may be used to reduce the IIS network footprint.

The above-described approach provides numerous advantages. The techniques described herein facilitate the delivery of high definition video and audio (including advanced video features, such as DVR) over an HTTP-edge network which, in a typical CDN, is the network that has the largest footprint. By implementing the techniques, a provider can leverage its existing HTTP-based servers instead of having to implement and maintain dedicated server networks to support multiple third party runtime environments. Moreover, because the delivery is HTTP-based, the content can be seamlessly delivered to clients operating across fixed line and mobile environments. No special client software is required, as the HTTP proxy (that responds to the client request) dynamically re-assembles fragments that it obtains and serves the requested content via HTTP. Further, because delivery within the set of interconnected machines of the CDN preferably takes advantage of an intermediate format, the network can ingest content in one format yet serve it in another, all while preserving single or multi-bitrates and DVR-like functionality. Thus, for example, the network may take in live RTMP packets and serve the content as an FLV progressive download. Preferably, each IF fragment of the stream is a separate object for the HTTP proxy that can be accessed, cached, and served via HTTP. According to the scheme, the stream is broken up into many small objects (fragments), with each fragment managed separately.

The network is not limited for use with any particular runtime environment such as Flash. By leveraging the approach as described, a single set of content sources can be leveraged for different device capabilities. Thus, the techniques as described herein include dynamically transmuxing content to other file formats in a manner that is transparent to the content provider and the end user.

The intermediate format may be based on or adapted from any convenient multimedia file format that can be used delivery and playback of multimedia content. These include, without limitation, fragmented mp4, protected interoperable file format (piff), and others. More generally, any linked list-based file format may be used.

Preferably, the CDN service provider provides an extranet (a web-based portal) through which the stream delivery is provisioned.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like. follows:

Having described our invention, what we now claim is as follows:

1. Apparatus for use in a set of interconnected machines of an overlay network that are distinct from a content origin, and end user client machines, comprising:
   one or more processors;
   computer memory holding computer program instructions executed by the one or more processors to retrieve and serve, to one or more edge machines within the set of interconnected machines of the overlay network, an Internet Protocol (IP)-based stream of audiovisual media content, the stream being stored within the set of interconnected machines of the overlay network in a single intermediate format comprising a stream manifest, a set of fragment indexes (FI), and a set of intermediate (IF) fragments, the computer program instructions comprising:
   program code to intercept a content request at an intermediary machine within the interconnected machines, the content request issued from an edge machine in the set of interconnected machines;
   program code to service the content request within the set of interconnected machines by providing chunked adaptive streaming from the intermediary to at least one edge machine in the set of interconnected machines;
   the at least one edge machine comprising:
      an HTTP proxy including a partial object cache (POC); and
      a translator process, the HTTP proxy and the translator process interfacing to one another via a shared memory portion;
         the HTTP proxy responsive to receipt of a request for content to determine whether a stream manifest associated with the content exists in the partial object cache, to return the stream manifest in response to the request when the stream manifest exists, and to request the translator process to generate the stream manifest otherwise;
         the HTTP proxy responsive to receipt of a request for a fragment index associated with the stream manifest to determine whether the fragment index exists in the partial object cache, to return the fragment index in response to the request for the fragment index when the fragment index exists, and to request the translator process to obtain the fragment index otherwise; and
         the HTTP proxy responsive to receipt of a request for one or more fragments identified by the fragment index to retrieve and serve the one or more fragments from the partial object cache;
         wherein the content request is a request for a live stream, and wherein the HTTP proxy fetches chunk information from an entry point when a request timestamp is within a given time period of a last chunk's timestamp, and wherein the HTTP proxy fetches chunk information from a persistent data store when the request timestamp is older than the given time period.

2. The apparatus as described in claim 1 wherein the content request is a request for an on-demand stream.

3. The apparatus as described in claim 1 wherein the stream manifest includes one or more bitrates of a multi-bit (MBR) stream.

4. The apparatus as described in claim 1 wherein the request for content is received from an edge machine.

5. The apparatus as described in claim 1 wherein the HTTP proxy is further operative to issue one or more requests to an origin server to obtain the one or more fragments.

6. The apparatus as described in claim 1 further including a stream cache associated with the shared memory portion for caching the one or more fragments.

\* \* \* \* \*